(12) United States Patent
Pitroda et al.

(10) Patent No.: US 11,755,334 B2
(45) Date of Patent: Sep. 12, 2023

(54) SYSTEMS AND METHODS FOR AUGMENTED NOTIFICATIONS IN REMOTE MANAGEMENT OF AN IHS (INFORMATION HANDLING SYSTEM)

(71) Applicant: Dell Products, L.P., Round Rock, TX (US)

(72) Inventors: Hiren Kishorbhai Pitroda, Rajkot (IN); Abhirup Seal, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 196 days.

(21) Appl. No.: 17/502,984

(22) Filed: Oct. 15, 2021

(65) Prior Publication Data
US 2023/0119884 A1    Apr. 20, 2023

(51) Int. Cl.
*G06F 15/177* (2006.01)
*G06F 9/4401* (2018.01)
*G06F 11/14* (2006.01)
*G06F 9/54* (2006.01)
*G06F 11/30* (2006.01)
*G06F 3/06* (2006.01)
*H04L 41/0803* (2022.01)

(52) U.S. Cl.
CPC .......... *G06F 9/4401* (2013.01); *G06F 3/0605* (2013.01); *G06F 3/067* (2013.01); *G06F 3/0629* (2013.01); *G06F 9/542* (2013.01); *G06F 9/546* (2013.01); *G06F 11/142* (2013.01); *G06F 11/1438* (2013.01); *G06F 11/3034* (2013.01); *H04L 41/0803* (2013.01)

(58) Field of Classification Search
CPC .... G06F 9/4401; G06F 3/0605; G06F 3/0629; G06F 3/067; G06F 9/542; G06F 9/546; G06F 11/142; G06F 11/1438; G06F 11/3034; H04L 41/0803
USPC ........................................ 709/220, 223, 229
See application file for complete search history.

(56) References Cited

U.S. PATENT DOCUMENTS

| | | | | |
|---|---|---|---|---|
| 4,553,262 A | * | 11/1985 | Coe ....................... | H04W 84/08 370/293 |
| 5,838,766 A | * | 11/1998 | Rand ....................... | H04Q 1/24 370/244 |
| 11,023,557 B2 | * | 6/2021 | Pavitt ..................... | G06F 16/958 |

(Continued)

*Primary Examiner* — Liang Che A Wang
(74) *Attorney, Agent, or Firm* — Fogarty LLP

(57) ABSTRACT

Systems and methods are provided for supporting remote management of an IHS (Information Handling System). A first remote management command is received at an IHS. Managed hardware components of the IHS are identified that are configured by the first remote management command. While the first remote management command is pending, a mapping is maintained of the command and the managed hardware components configured by the command. A second remote management command is received that is related to a component of the IHS. Based on the maintained mapping, a determination is made whether the component of the second remote management command is configured by the pending first management command. When the component of the second remote management command is configured by the pending first management command, a notification of the pending first management command is appended to a response to the second management command.

19 Claims, 3 Drawing Sheets

(56) References Cited

U.S. PATENT DOCUMENTS

| | | | | |
|---|---|---|---|---|
| 2004/0111307 A1* | 6/2004 | Demsky | ............... | G06Q 10/06 |
| | | | | 705/7.24 |
| 2007/0266160 A1* | 11/2007 | Johnson | ............... | G06F 16/951 |
| | | | | 707/E17.108 |
| 2017/0091089 A1* | 3/2017 | Brizio | ............... | G06F 12/084 |
| 2022/0100524 A1* | 3/2022 | Gupta | ............... | H04L 41/04 |

* cited by examiner

SYSTEMS AND METHODS FOR AUGMENTED NOTIFICATIONS IN REMOTE MANAGEMENT OF AN IHS (INFORMATION HANDLING SYSTEM)

FIELD

The present disclosure generally relates to Information Handling Systems (IHSs), and, more particularly, to remote monitoring and management of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A datacenter may include a large number of IHSs, such as servers, that are installed within chassis and stacked within slots provided by racks. A datacenter may include large numbers of such racks that are filled with servers, or other types of IHSs. In some cases, datacenter IHSs may be locally managed by an administrator, such as using keyboard, video display, and mouse (KVM) capabilities that are supported within the datacenter. However, effective management of datacenter IHSs typically also includes the use of remote management capabilities that allow administrators to monitor, manage and update IHSs over a network connection. Tools effectively enable remote management of IHSs, but can generate large volumes of notifications that become of limited use to administrators, especially when the notifications cannot be associated with the underlying events within an IHS that caused the notifications.

SUMMARY

In various embodiments, IHSs (Information Handling Systems) are provided that may include: a plurality of managed hardware components; one or more processors; and one or more memory devices coupled to the processors, the memory devices storing computer-readable instructions that, upon execution by the processors, cause the IHS to: receive a first remote management command; determine one or more of the manage hardware components of the IHS that are configured by the first remote management command; while the first remote management command is pending, maintain a mapping of the first remote management command and the managed hardware components of the IHS configured by the first remote management command; receive a second remote management command related to a component of the IHS; based on the maintained mapping, determine whether the component of the second remote management command is configured by the pending first management command; and when the component of the second remote management command is configured by the pending first management command, append of notification of the pending first management command to a response to the second management command.

Some IHS embodiments may include a remote access controller comprising one or more logic units and further comprising one or more memory devices storing computer-readable instructions that, upon execution by the logic units, cause the remote access controller to: identify managed hardware components of the IHS that are configured by the first remote management command based on sideband management communications between the remote access controllers and the managed hardware components. In some IHS embodiments, the remote management commands and the response are compliant with a Redfish protocol. In some IHS embodiments, a remote management tool issuing the second remote management command is provided the appended notification of the pending first management command without subscribing to a notification of the first management command. In some IHS embodiments, the second management command comprises a GET request issued according to the Redfish protocol. In some IHS embodiments, the transmitted response comprises a JSON object and wherein the notifications are appended to the response as an ExtendedInfo annotation to the JSON object. In some IHS embodiments, the first remote management command comprises a reconfiguration of a plurality of storage drives of the IHS and the second remote management command comprises a status request for a first of the plurality of storage drives. In some IHS embodiments, the first remote management command comprises a firmware update for a hardware component of the IHS and the second remote management command comprises a configuration of the hardware component. In some IHS embodiments, execution of the instructions by the processors further causes the IHS to: maintain a mapping of pending system-wide events. In some IHS embodiments, execution of the instructions by the processors further causes the IHS to: append of notification of the pending system-wide events to the response to the second management command. In some IHS embodiments, the system-wide events comprise a restart of the IHS.

In various additional embodiments, methods support remote management of an IHS (Information Handling System). The methods may include: receiving a first remote management command; determining one or more of the manage hardware components of the IHS that are configured by the first remote management command; while the first remote management command is pending, maintaining a mapping of the first remote management command and the managed hardware components of the IHS configured by the first remote management command; receiving a second remote management command related to a component of the IHS; based on the maintained mapping, determining whether the component of the second remote management command is configured by the pending first management command; and when the component of the second remote management command is configured by the pending first management command, appending of notification of the pending first management command to a response to the second management command.

In some method embodiments, the remote management commands and the response are compliant with a Redfish protocol. In some method embodiments, a remote management tool issuing the second remote management command is provided the appended notification of the pending first management command without subscribing to a notification of the first management command. Some method embodiments further include maintain a mapping of pending system-wide events and append of notification of the pending system-wide events to the response to the second management command. In some method embodiments, the system-wide events comprise a restart of the IHS.

In various additional embodiments, computer-readable storage devices include instructions stored thereon for supporting remote management of an IHS (Information Handling System). Execution of the instructions by one or more processors of the IHS causes the one or more processors to: receive a first remote management command; determine one or more of the manage hardware components of the IHS that are configured by the first remote management command; while the first remote management command is pending, maintain a mapping of the first remote management command and the managed hardware components of the IHS configured by the first remote management command; receive a second remote management command related to a component of the IHS; based on the maintained mapping, determine whether the component of the second remote management command is configured by the pending first management command; and when the component of the second remote management command is configured by the pending first management command, append of notification of the pending first management command to a response to the second management command.

In some storage device embodiments, the remote management commands and the response are compliant with a Redfish protocol. In some storage device embodiments, a remote management tool issuing the second remote management command is provided the appended notification of the pending first management command without subscribing to a notification of the first management command. In some storage device embodiments, execution of the instructions by the processors further causes the IHS to: maintain a mapping of pending system-wide events and append of notification of the pending system-wide events to the response to the second management command.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
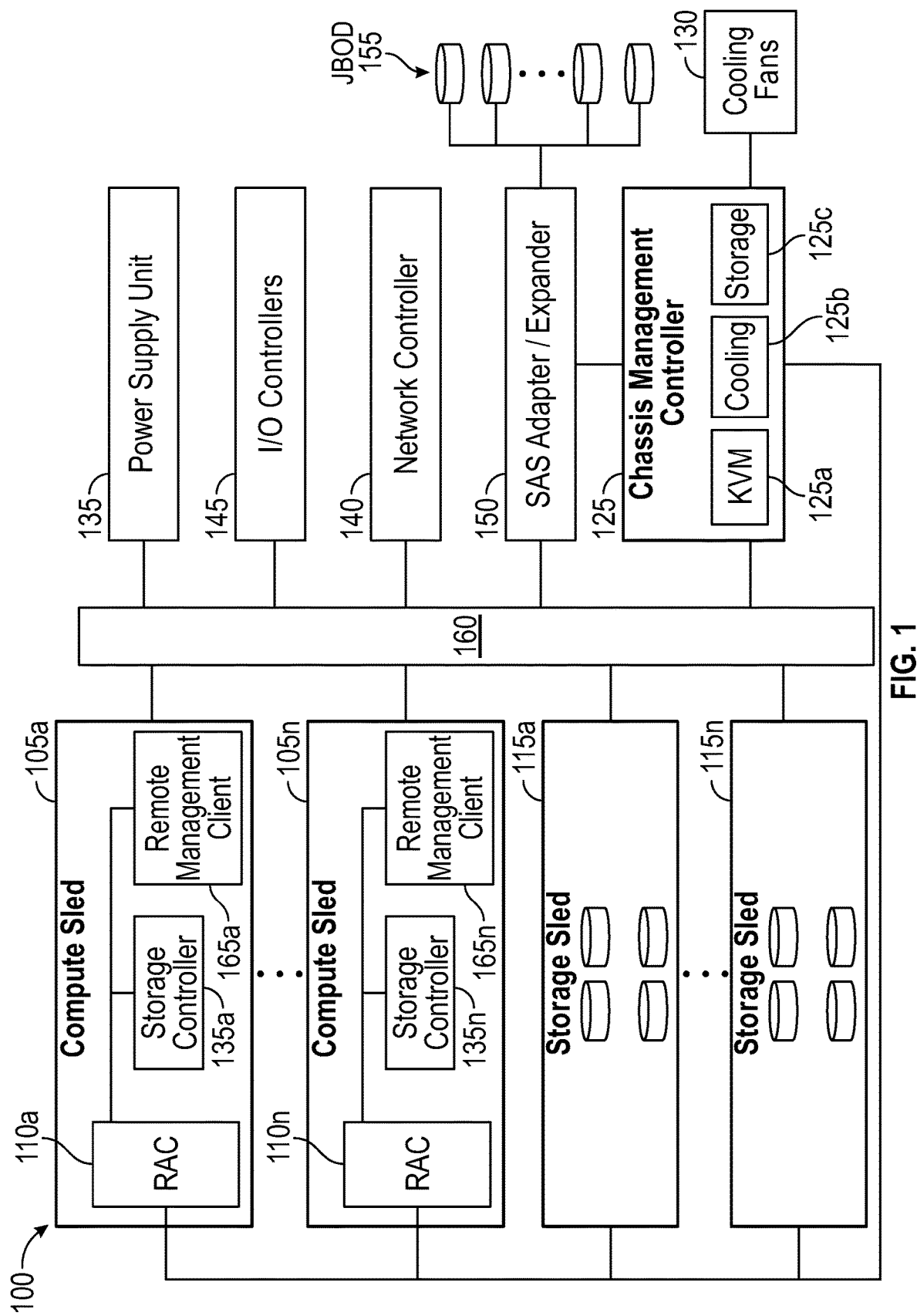
FIG. 1 is a diagram illustrating certain components of a chassis configured, according to some embodiments, to support augmented notifications provided in the remote management of IHSs installed within the chassis.

FIG. 1 is a block diagram illustrating certain components of a chassis 100 comprising one or more compute sleds 105a-n and one or more storage sleds 115a-n, where each of the sleds 105a-n, 115a-n may be configured to implement the systems and methods described herein to support augmented notifications provided in the remote management of the sleds installed in chassis 100. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
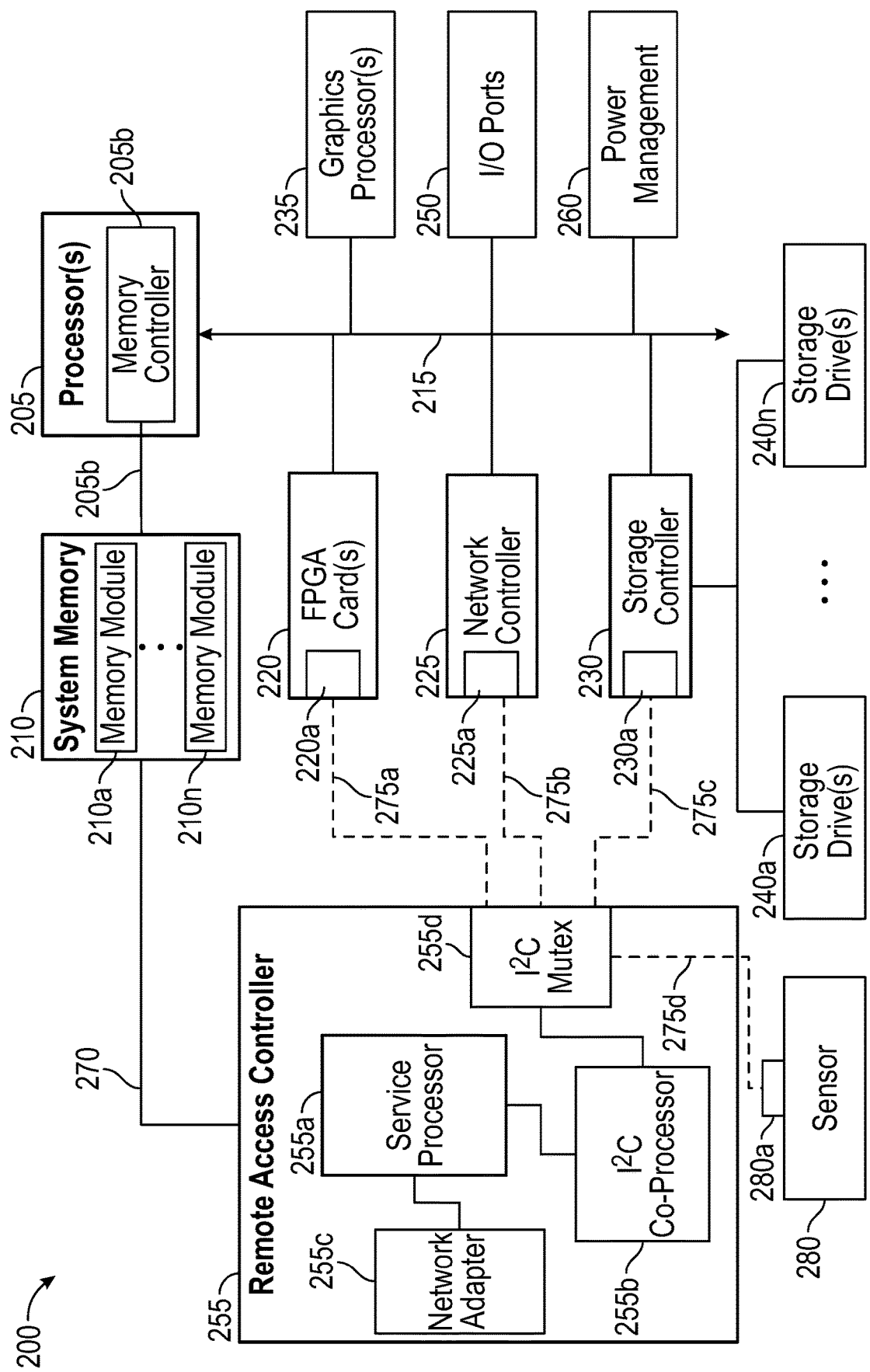
FIG. 2 is a diagram illustrating certain components of an IHS configured as a component of chassis, according to some embodiments, to support augmented notifications provided in the remote management of the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controllers 110a-n may collect sensor data, such as temperature sensor readings, from components of the chassis 100 in support of airflow cooling of the chassis 100 and the sleds 105a-n, 115a-n. In addition, each remote access controller 110a-n may implement various monitoring and administrative functions related to compute sleds 105a-n that require sideband bus connections with various internal components of the respective compute sleds 105a-n. As described in additional detail below, remote access controllers 110a-n also support remote monitoring and management of various internal components of the respective compute sleds 105a-n via in-band communications that are supported by the operating systems of the respective compute sleds 105a-n. In some embodiments, each remote access controller 110a-n supports a remote management client that interfaces with remote management tools, such as via a Redfish remote management connection. As described in additional detail below, embodiments provided augmented responses to management commands and requests in a manner that relays important status information that is related to the command or request.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting augmented notifications provided in the remote management of the IHS 200. It should be appreciated that although the embodiments described herein may describe an IHS that is a compute sled or similar computing component that may be deployed within the bays of a chassis, other embodiments may be utilized with other types of IHSs that may also support remote monitoring of dynamic devices. In the illustrative embodiment of FIG. 2, IHS 200 may be a computing component, such as compute sled 105a-n or other type of server, such as an 1RU server installed within a 2RU chassis, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

As illustrated, IHS 200 may include one or more FPGA (Field-Programmable Gate Array) card(s) 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of the logic units, each individual FPGA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

In some embodiments, remote access controller 255 may support a remote management client that interfaces with one or more remote management tools, such as via a Redfish remote management connection. Via such connections, remote management tools may query a wide variety of information about the status of an IHS 200 and components installed therein. However, without registering for notification about specific events occurring on IHS 200, remote management tools may have incomplete information about the state of IHS 200. As a result, these remote management tools may issue commands and requests to a remote management client that is operate by remote access controller 255 in which the standard response to such commands will provide incomplete information, or may omit important status information about the state of the IHS. As described in additional detail below, embodiments provided augmented responses to management commands and requests in a manner that relays important status information that is related to the command or request.

In some embodiments, the remote management client supports such augmented notification capabilities by maintaining a mapping of pending management tasks and IHS resources that are related to those tasks. For instance, upon receipt of a remote management command scheduling a restart of the IHS, such as in response to a firmware upgrade that is being made, the remote management client may maintain a record of this restart request as a pending management tasks that has system-wide relevance. In such instances, embodiments may append a notification of the pending restart in response to all remote management commands and requests that are received until the pending restart is actually initiated. In another example, upon receipt of a remote management command that reconfigures one or more storage drives 240*a-n* or generates a snapshot of the contents of those storage drives, the remote management client may maintain a record of this reconfiguration as pending and as affecting storage drives 240*a-n*. In such instances, embodiments may append a notification of the reconfiguration in response to all remote management commands and requests that are received and that pertain to the storage drives 240*a-n*, such as requests for storage capacity information in one or more of the storage drives.

In some embodiments, a remote access controller 255 of the IHS 200 may utilize out-of-band management connections with managed components 220, 225, 230, 280 of the IHS in order to identify specific hardware components of the IHS that are affected by a remote management command. For instance, upon a remote management command being initiated that generates a snapshot of a storage volume spanning multiple of the storage drives 240*a-n*, remote access controller 255 may interface with storage controller 230 in order to query the status of the specific storage drives that are included in the reconfiguration of the storage volume. Since the storage volume may span different types of storage devices (e.g., including both SSDs and magnetic storage drives) and may vary significantly with regard to the amount of data that is stored by each individual drive, each of the drives may be affected differently by the reconfiguration operation. Accordingly, while the reconfiguration management task remains pending, remote access controller 255 may periodically interface with storage controller 230 to determine the status of each of storage drives in the storage volume. As the reconfiguration is completed for each of the storage drives in the volume, the remote access controller 255 updates the list of pending management tasks to reflect the storage drives that are still affected by the reconfiguration. In this manner, augmented notifications of the reconfiguration will be appended to response pertaining to only the storage drives that remain actively involved in the reconfiguration, such that they may provide inconsistent and/or delayed responses.

Remote access controller 255 may include a service processor 255*a*, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225*c* may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275*a-d* that may be individually established with each of the respective managed devices 220, 225, 230, 280 through the operation of an I2C multiplexer 255*d* of the remote access controller. As illustrated, certain of the managed devices of IHS 200, such as FPGA cards 220, network controller 225 and storage controller 230, are coupled to the IHS processor(s) 205 via an in-line bus 215, such as a PCIe root complex, that is separate from the I2C sideband bus connections 275*a-d* used for device management. In various embodiments, additional or different components of IHS 200 may be managed by remote access controller 225 through the use of sideband bus connections. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280.

In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280. In certain embodiments, the endpoint I2C controller 280a of the FPGA card 220 may correspond to the management controller 220a described above.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
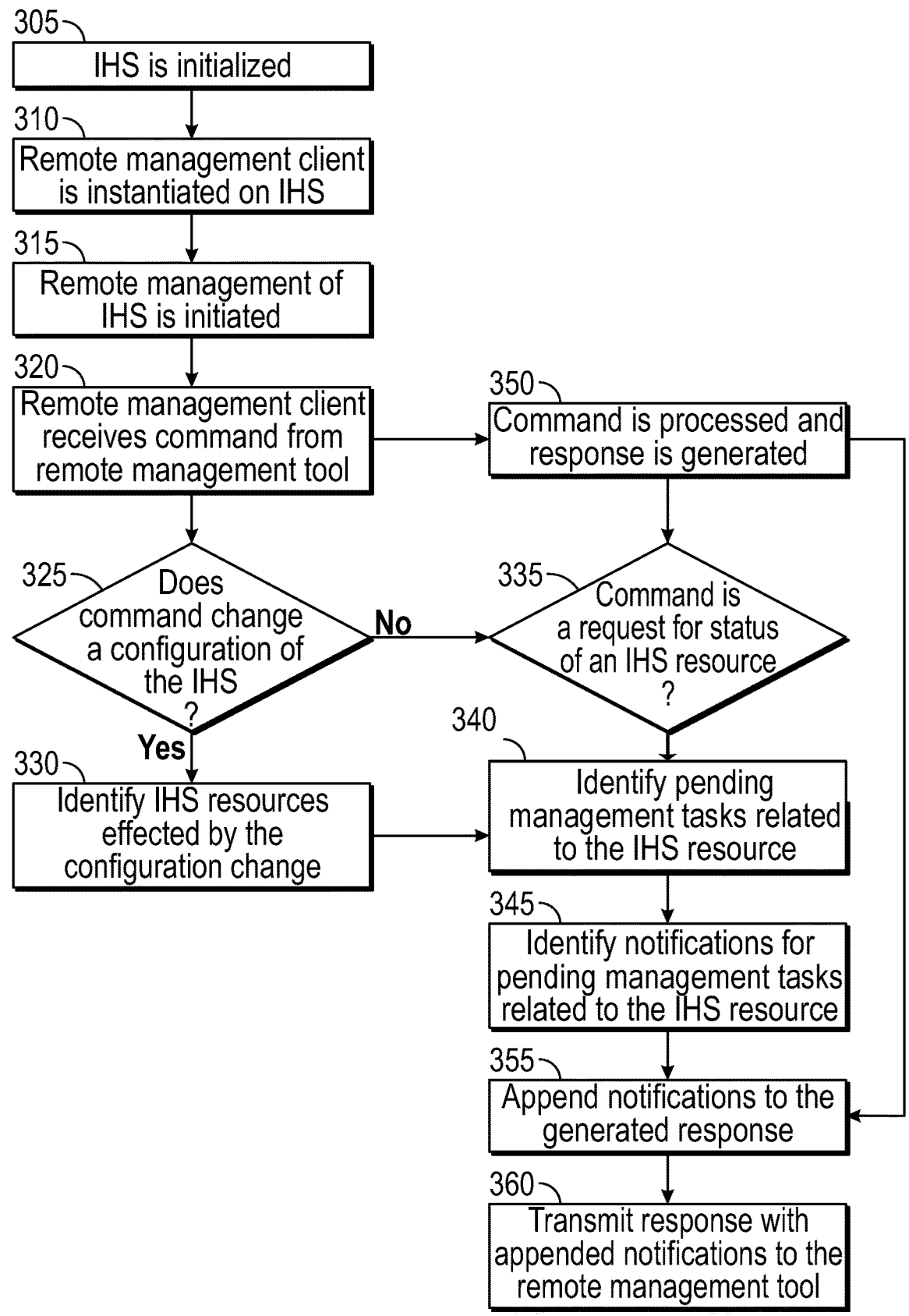
FIG. 3 is a flowchart describing certain steps of a method, according to some embodiments, for supporting augmented notifications provided in the remote management of an IHS.

FIG. 3 is a flowchart describing certain steps of a method, according to some embodiments, for supporting augmented notifications provided in the remote management of an IHS. As described above, remote management tools may receive a wide variety of information from an IHS, including event and status information. However, in order to receive notifications of status and event information via remote management interfaces such as Redfish, a remote management tool must register as a subscriber of such notifications. This results in remote management tools utilizing lengthy scripts that are used to automatically register the management tools for all possible notifications that may be generated by an IHS. Accordingly, such management tools may be flooded with large volumes of notifications from a single IHS. In addition to receiving status and event notifications from an IHS, remote management tools may be concurrently used to initiate various queries, such as a storage capacity query, and procedures, such as a reconfiguration of the storage drives used in a RAID implementation. These scenarios are further complicated by the ability for multiple administrators being able to utilize the remote management tools concurrently and may be concurrently initiating queries and procedures on the same IHS. As a result, different administrators may concurrently initiate remote management tasks that are conflict or that could affect each other.

Some embodiments may begin at block 305 with the initialization of an IHS, such as the IHS described with regard to FIG. 2, where the initialization may include powering or restarting of the IHS and booting of its operating system. As described with regard to FIG. 2, embodiments may utilize a remote management client that runs or within an environment hosted by a remote access controller of the IHS, or within the operating system of an IHS. Once an IHS has been deployed, such as within a datacenter, at block 310, such a remote management client may be instantiated and put into operation on the initialized IHS, thus allowing local and remote administrators to concurrently manage the IHS.

With the remote management client in operation, at block 315, remote management of the IHS may be initiated. In some embodiments, the communications between the remote management client operating on the IHS and remote management tools utilized by administrators may conform to the Redfish remote management interface that is based on DMTF (Distributed Management Task Force) standards for device management. A variety of remote management tools may be utilized by remote administrators in managing an IHS. The remote management tools provided for use by administrators may retain an inventory of the hardware, software and firmware of an IHS that is being remotely managed through the operation of the remote management client operating on the IHS. The remote management tools may also include various monitoring interfaces for evaluating telemetry data collected by the remote management client operating on the IHS. The remote management tools may also include configuration information for some or all of the hardware components that are being managed. This information that is maintained by the remote management tools may be used to initiate a wide variety of management operations on an IHS, such as adding and remote software programs, updating firmware, reconfiguring the operation of devices such as storage drives and network controllers, updating the operation of FPGAs and modifying power settings. As described, such operations may be initiated concurrently by separate administrators.

As described above, a remote access controller may be a component of an IHS that operates externally from the operating system of that IHS and that provides remote monitoring and management of various managed devices of an IHS. The remote access controller may interface with the managed devices via sideband management connections that are external to the operating system. The remote access controller may support remote management of the managed devices of an IHS by a set of remote monitoring and management tools. Such remote management tools may provide an administrator with various capabilities for remotely investigating, diagnosing and administering the operation of an IHS. However, due to remote management tasks being executed concurrently, different management operations may be initiated that can have adverse effects on the other. For example, a first management command may initiate a firmware update for a network controller that is followed by a reboot of the network controller. However, while the firmware update is in progress, a second management command may be initiated that reconfigures the allocation of the network bandwidth by the network controller. Due to the firmware update and restart, the command to reconfigure bandwidth of the network controller may fail, and may do so in an unpredictable and thus confusing manner. Embodiments provide augmented notifications in response to remote management commands that provide relevant status information without the remote management tool having to issue a query for that status information.

During administration of an IHS configured according to embodiments by remote management tools, at 320, the remote management client operating on the IHS receives a command from the remote management tool. As described, a wide variety of commands may be received from a remote management tool. As illustrated, at 350, the remote management client may process the command and generate a response. In various scenarios, the response may specify a confirmation that the command has been received and/or processed and may also provide requested information, such as status information for managed components of the IHS. This processing of the received command may involve the remote management client interfacing with one or more of the managed components of the IHS. In processing the received command by the remote management client of an IHS, embodiments generate augmented notification information that is appended to responses to remote management tools.

While processing of the received command is ongoing, at 325, remote management client determines whether the received command changes a configuration of the IHS. For instance, remote management commands to reconfigure the allocation of network bandwidth by a network controller changes the configuration of the IHS, whereas a command that is query for the network bandwidth utilization of the network controller does not affect the configuration of the IHS. Similarly, a remote management command to update the firmware of a component constitute changes to the configuration of the IHS, while a power status query does not change the configuration of the IHS.

If a configuration of the IHS is affected by the command, at 330, the remote management client identifies resources of the IHS that are affected by the configuration change. In addition, the remote management client may maintain a mapping of these resource affected by the configuration change that is initiated by the remote management command. As described, such mappings of affected resources may be maintained for all management operations that remain pending. For instance, a command to alter a RAID configuration may affect one or all storage drives of an IHS. While the RAID reconfiguration is pending, the remote management client may maintain the mapping of the pending RAID reconfiguration to the storage drives.

In instances where the received command does not correspond to a configuration change, at 335, the remote management client determines whether the received command corresponds to a request or query for status information for a managed component of the IHS. For instance, a received command may request a storage capacity for a storage drive. At 340, the remote management client determines pending remote management operations that are related to the managed component. For instance, in response to the request for capacity of a storage drive, the remote management client searches the resources affected by the pending RAID configuration to determine that this pending operation is related to the received query.

If the resource is identified as related to a pending management operation, at 345, the remote management client determines notifications for the pending management operation that should be included in the response. For instance, in response to the capacity query, embodiments may append a notification of the pending reconfiguration of the storage drive. In another example when a firmware update for a storage controller has been received by the remote management client and the firmware updated is followed by a restart of the storage controller, a response to a subsequent command to initiate a new RAID deployment using the storage controller may be augmented by embodiments with notification that a firmware update and restart by the storage controller is pending.

In some embodiments, certain system wide information may be appended to all responses to remote management commands. For instance, a remote management client may be receiving notifications of an expected power system failure. In another example, a remote management client may receive notification of a scheduled restart of the IHS. In these instances, all components and operations may be adversely affected by such system-wide issues. Accordingly, embodiments may track such system wide issues along with the mapping of components that are specially affected by pending management operations. As long as such system wide issues remain pending, they may be appended to all responses by the remote management client.

As illustrated in FIG. 3, at 355, these notifications generated by embodiments are appended to the command response that is generated at 350 by the remote management client in response to the received command. This response, including the appended notifications, is transmitted, at 360, to the remote management tool. In embodiments where the remote management client operates according to Redfish protocols, the response may be a JSON file providing the response to the command that was generated at 350, in which case the augmented notifications may be included in the JSON file as an Extended Info annotation to the JSON file. In this manner, embodiments are compatible with existing Redfish management interfaces. By providing the appended notifications, embodiments provide relevant and important notifications in response to received commands, without the remote management tool having to query for such notifications or register as a subscriber to such notifications.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
a plurality of managed hardware components;
one or more processors; and
one or more memory devices coupled to the processors, the memory devices storing computer-readable instructions that, upon execution by the processors, cause the IHS to:
receive a first remote management command;
determine one or more of the managed hardware components of the IHS that are configured by the first remote management command;
while the first remote management command is pending, maintain a mapping of the first remote management command and the managed hardware components of the IHS configured by the first remote management command;
receive a second remote management command related to a component of the IHS;
based on the maintained mapping, determine whether the component of the second remote management command is configured by the pending first management command; and
when the component of the second remote management command is configured by the pending first management command, append of notification of the pending first management command to a response to the second management command, and
a remote access controller comprising one or more logic units and further comprising one or more memory devices storing computer-readable instructions that, upon execution by the logic units, cause the remote access controller to determine the managed hardware components of the IHS that are configured by the first remote management command based on sideband management communications between the remote access controller and the managed hardware components.

2. The IHS of claim 1, wherein the remote management commands and the response are compliant with a Redfish protocol.

3. The IHS of claim 1, wherein a remote management tool issuing the second remote management command is provided the appended notification of the pending first management command without subscribing to a notification of the first management command.

4. The IHS of claim 1, wherein the first management command is generated by a first administrator at a first location and the second management command is generated by a second administrator at a second location.

5. The IHS of claim 4, wherein the transmitted response comprises a JSON object and wherein the notifications are appended to the response as an ExtendedInfo attribute to the JSON object.

6. The IHS of claim 1, wherein the first remote management command comprises a reconfiguration of a plurality of storage drives of the IHS and the second remote management command comprises a status request for a first of the plurality of storage drives.

7. The IHS of claim 1, wherein the first remote management command comprises a firmware update for a hardware component of the IHS and the second remote management command comprises a configuration of the hardware component.

8. The IHS of claim 1, wherein execution of the instructions by the processors further causes the IHS to: maintain a mapping of pending system-wide events.

9. The IHS of claim 8, wherein execution of the instructions by the processors further causes the IHS to: append notification of the pending system-wide events to the response to the second management command.

10. The IHS of claim 9, wherein the system-wide events comprise a restart of the IHS.

11. A method for supporting remote management of an IHS (Information Handling System), the method comprising:
receiving a first remote management command;
determining one or more of the managed hardware components of the IHS that are configured by the first remote management command, wherein the managed hardware components of the IHS that are configured by the first remote management command are determined based on sideband management communications between a remote access controller of the IHS and the managed hardware components, wherein the remote access controller comprises one or more logic units and further comprises one or more memory devices storing computer-readable instructions that, upon execution by the logic units, cause the remote access controller to determine the managed hardware components of the IHS;
while the first remote management command is pending, maintaining a mapping of the first remote management command and the managed hardware components of the IHS configured by the first remote management command;
receiving a second remote management command related to a component of the IHS;
based on the maintained mapping, determining whether the component of the second remote management command is configured by the pending first management command; and
when the component of the second remote management command is configured by the pending first management command, appending of notification of the pending first management command to a response to the second management command.

12. The method of claim 11, wherein the remote management commands and the response are compliant with a Redfish protocol.

13. The method of claim 11, wherein a remote management tool issuing the second remote management command is provided the appended notification of the pending first management command without subscribing to a notification of the first management command.

14. The method of claim 11, further comprising: maintain a mapping of pending system-wide events and append of notification of the pending system-wide events to the response to the second management command.

15. The method of claim 14, wherein the system-wide events comprise a restart of the IHS.

16. A computer-readable storage device having instructions stored thereon for supporting remote management of an IHS (Information Handling System), wherein execution of the instructions by one or more processors of the IHS causes the one or more processors to:
receive a first remote management command;
determine one or more of the managed hardware components of the IHS that are configured by the first remote management command, wherein the managed hardware components of the IHS that are configured by the first remote management command are determined based on sideband management communications between a remote access controller of the IHS and the managed hardware components, wherein the remote access controller comprises one or more logic units and further comprises one or more memory devices storing computer-readable instructions that, upon execution by the logic units, cause the remote access controller to determine the managed hardware components of the IHS;
while the first remote management command is pending, maintain a mapping of the first remote management command and the managed hardware components of the IHS configured by the first remote management command;
receive a second remote management command related to a component of the IHS;
based on the maintained mapping, determine whether the component of the second remote management command is configured by the pending first management command; and
when the component of the second remote management command is configured by the pending first management command, append of notification of the pending first management.

17. The storage device of claim 16, wherein the remote management commands and the response are compliant with a Redfish protocol.

18. The storage device of claim 16, wherein a remote management tool issuing the second remote management command is provided the appended notification of the pending first management command without subscribing to a notification of the first management command.

19. The storage device of claim 16, wherein execution of the instructions by the processors further causes the processors to: maintain a mapping of pending system-wide events and append of notification of the pending system-wide events to the response to the second management command.

* * * * *

UNITED STATES PATENT AND TRADEMARK OFFICE
CERTIFICATE OF CORRECTION

PATENT NO. : 11,755,334 B2
APPLICATION NO. : 17/502984
DATED : September 12, 2023
INVENTOR(S) : Hiren Kishorbhai Pitroda and Abhirup Seal It is certified that error appears in the above-identified patent and that said Letters Patent is hereby corrected as shown below:

In the Claims

In Column 18, Line 13, Claim 16, delete "first management." and insert --first management command to a response to the second management command.-- therefor.

Signed and Sealed this
Tenth Day of October, 2023

Katherine Kelly Vidal
*Director of the United States Patent and Trademark Office*